United States Patent [19]

Mullenax

[11] 4,430,463
[45] Feb. 7, 1984

[54] ACRYLIC POLYMER PORTLAND CEMENT COATING COMPOSITION

[75] Inventor: Perry D. Mullenax, Youngstown, Ohio

[73] Assignee: Michigan Hanger Company, Inc., Hubbard, Ohio

[21] Appl. No.: 418,579

[22] Filed: Sep. 15, 1982

[51] Int. Cl.³ .................. C08L 33/02; C08L 33/18; C08L 83/04

[52] U.S. Cl. .................................. 524/5; 404/32; 428/500; 428/522

[58] Field of Search ............................................ 524/5

[56] References Cited

U.S. PATENT DOCUMENTS

| | | | |
|---|---|---|---|
| 3,196,122 | 7/1965 | Evans | 524/5 |
| 3,493,529 | 2/1970 | Krottinger et al. | 524/5 |
| 3,538,036 | 11/1970 | Peters et al. | 524/5 |
| 3,547,853 | 12/1970 | Kalandiak | 524/5 |

*Primary Examiner*—Harold D. Anderson
*Attorney, Agent, or Firm*—Harpman & Harpman

[57] ABSTRACT

Improved Portland cement compositions and their use in cement coating operations is disclosed wherein acrylic polymers modified by critical amounts of propylene glycol, a coloring ingredient and a defoaming agent such as dimethyl polysiloxane are used as additives substantially increasing the flexibility, abrasion and heat resistance and shear bond characteristics of Portland cement and sand mixtures used in coating compositions for concrete, wood, pressed boards and the like.

6 Claims, No Drawings

ACRYLIC POLYMER PORTLAND CEMENT COATING COMPOSITION

BACKGROUND OF THE INVENTION (1) Field of the Invention

This invention relates to improving the flexibility, abrasion and heat resistance and particularly shear bond (adhesive) characteristics of acrylic polymer Portland cement coating compositions.

(2) Description of the Prior Art:

The prior art is represented by U.S. Pat. No. 4,263,372, which discloses the use of dicyclopentenyl acrylic or methacrylate or a mixture thereof as a hydrophobic binder material in various particulate aggregate systems in conjunction with cementitious materials such as hydraulic cements.

U.S. Pat. No. 4,329,822 discloses a filled polymeric wall facing unit in which a polyester composition such as unsaturated polymerizable polyester resin filled with sand as a suitable filler material and wherein the polymeric composition is applied to a building block which may be of concrete.

U.S. Pat. No. 4,031,282 discloses a similar coating material incorporating a polyester resin or the like for application to improve the esthetic appearance of the object coated.

A number of patents have been issued wherein the use of a polymer in a cement is disclosed. See for example U.S. Pat. Nos. 2,648,645, 3,239,479, 3,937,633, 4,060,425 and 4,211,572.

In U.S. Pat. No. 2,648,645, polyvinyl alcohol in a Portland cement composition is disclosed as being capable of reducing water loss from a slurry.

U.S. Pat. No. 3,937,633 discloses the use of a polymer in a cement slurry for reducing the water loss therefrom.

U.S. Pat. No. 3,239,479 discloses a Portland type cement containing a latex, such as a polymer, in which the composition is intended to retard the setting time of the composition.

U.S. Pat. No. 4,060,425 discloses a Portland cement mixture incorporating a halogen atom with one or more short range strength accelerators such as calcium aluminate and ethylene glycol together with a bituminous emulsion. The patent discloses the substitution of a rubber latex and a resin emulsion for the bituminous material and the result obtained is a rapid hardening cementitious mixture. The product is noted as being useful as a grout which has elastic properties for a slab-type track structure.

U.S. Pat. No. 4,211,572 discloses a dry set mortar in which the water retentive agents such as cellulose ethers are improved by the addition of small amounts of ethylene glycol or the like. The present invention produces a Portland cement coating composition consisting of sand, Portland cement, an acrylic polyer, a defoamer and a critical amount of propylene glycol. The resulting coating material has an unusual and unexpected shear bond characteristic when applied to concrete, wood, hardboard, metal, glass and other materials with unusual and unexpected flexibility along with high abrasion and heat resistance. The addition of a coloring agent to the coating composition such as any of the food coloring agents commercially supplied in an aqueous solution usually incorporating propylene glycol enables the essential propylene gylcol ingredient and the color ingredient to be combined and added to the composition and wherein the color ingredient provides color coding in the mixture when the composition is mixed with water to provide the desired consistency for application to the article being coated, for example a low slump consistency suitable for resurfacing concrete walkways, pavements, and the like, the color coding serving during the mixing process to indicate the presence of a desirable amount of water in the mixture with the color carrying over into the set coating and eventually disappearing.

SUMMARY OF THE INVENTION

A consistently flexible acrylic polymer Portland cement coating composition having unusual shear bond (adhesive) characteristics and unusually high abrasion and heat resistance is capable of safe and economic manufacture and can be conveniently mixed to a desired consistency with water and used in coating many materials to provide a highly desirable weather, wear, and heat resistant coating that remains bonded to the substrate material despite flexing of the same, incorporates sand, Portland cement, acrylic polymer, propylene glycol and a defoamer, a typical batch may comprise 53.6% by weight sand, 30.7% by weight Type I Portland cement, either white or gray, 6.3% acrylic polymer, 0.015% propylene glycol, 0.2% defoamer and 9.11% water. The propylene glycol may and preferably does contain a color additive.

DESCRIPTION OF THE PREFERRED EMBODIMENT

The composition of this invention is a material which may be generally termed an acrylic polymer Portland cement coating composition particularly suitable for forming thin, unusually durable coatings on concrete such as sidewalks and pavements, concrete block walls, wood panels, hardboards, metal panels as used in walls, floors, ceilings and roof structures in various constructions and glass panes or panels such as for example where a light blocking coating is applied to part of a glass pane or panel in a decorative manner with the coating material remaining permanently affixed to the glass pane or panel by its unusual shear bond characteristic.

The composition of this invention in a typical wet mix batch totaling 26.10 pounds incorporates 14 lbs. of sand, 8 lbs. of Portland cement (white) Type I, 1.68 lbs. acrylic polymer, 1.60 grams propylene glycol, 20 grams liquid defoamer and 38 ounces of water, the acrylic polymer is a water dispersion with the acrylic solids comprising 48%. A suitable acrylic polymer is commercial available as RHOPLEX MC-76 from Rohm and Haas Company of Philadelphia, Pa. 19105, and the defoamer is a liquid commercially available as NOPCO NXZ (100% active) from Process Chemicals Division of Diamond Shamrock Corporation Morristown, N.J. 07960. Dimethylpolysiloxane is suitable.

The sand in the foregoing example is preferably silica sand, known in the trade as No. 1 Q ROC DRY as commercially available from Pennsylvania Glass Co., Pittsburgh, Pa. 15235, a sandblasting grade.

The Portland cement Type I white is commercially available from Medusa Cement Company, Division of Medusa Corporation. Cleveland, Ohio.

The propylene glycol is an aqueous solution in which the propylene glycol comprises 16% by weight with a 2.5% coloring agent added. It is available from Durkee Famous Foods, Division of SCM Corporation, Cleveland, Ohio.

The acrylic polymer herein referred to may be an acrylic resin such as a thermal plastic polymer or copolymer of acrylic acid, methacrylic acid, esters of these acids or acrylonitrile. The propylene glycol herein referred to may be 1,2 propylene (1,2 dihydroxy propane), 1,2 propanediol, methylene glycol, or methyl glycol, and acts as a wetting agent, humectant and emulsifier in modifying the acrylic polymer so as to enable it to coat each grain of the silica sand in the wet mix of the Portland cement coating composition and flexibly bond the sand with the finely divided Portland cement particles.

In preparing the cement coating composition, thoroughly premix the sand and cement, thoroughly blend together the water dispersion of the acrylic polymer, the aqueous solution of the propylene glycol, the liquid defoaming agent, and the water, and add to the premixed sand and cement. The entire composition is then mixed thoroughly for from three to four minutes. The water content may be varied to obtain the desired consistency for the coating application, that is, trowel or spray. This is best performed by withholding a portion of the water from the initial mix and adding it as necessary to obtain the desired consistency of the coating composition.

The amount of acrylic polymer in the above example is based on cement weight and desired results. Acrylic dispersion to cement ratio would be a minimum of 10% and a maximum of 40%. The percentage of the propylene glycol to acrylic polymer is 0.001 and 0.002. The Portland cement content of the composition is relatively high compared with the usual Portland cement mixes.

It has been determined that the desired performance properties as hereinbefore set forth and confirmed by a laboratory report hereinafter given, are controlled by the amount of propylene glycol modifying the acrylic polymer.

An alternate composition having the same unusual and unexpected characteristics as the foregoing example may comprise the substitution of Portland cement gray Type 1 for the white Portland cement of the above example. The Portland cement gray Type 1 is also commerically available from Medusa Cement Company.

The prior art relating to cement additives such as acrylic polymer, is illustrated by a publication copyrighted in 1980 by Rohm & Haas Company with respect to its RHOPLEX (trademark) E-330, a cement mortar modifier. This publication states that cement mortars modified with the product are hard, tough, and durable and compared with unmodified mortars, polymer modified mortars have superior flexural, adhesive and impact strength as well as excellent abrasion resistance. Properties of Portland cement mortars to which the Rohm & Haas polymer were added are reported with respect to compressive strength utilizing the American Society for Testing and Materials Test Standards with a sample of the concrete after a 28 day dry cure showing a reading of 5,450 PSI. A sample of the Portland cement coating composition of the present invention tested in Pittsburgh Testing Laboratory utilizing the same test method of the 28 day air cured test samples showed an average reading of 5,410 PSI which is substantially the same as the Rohm & Haas reported test.

On flexural strength, again using a 28 day air cured sample, and the same Rohn & Haas test methods, the Rohm & Haas publication reports a reading of 1,355 PSI, whereas the Pittsburgh Testing Laboratory test average on 28 day samples of the gray composition of the present invention showed a reading of 1,870 PSI and 3700 PSI on the white cement composition after 7 days air cure; a substantial improvement.

On shear bond adhesion, the Rohm & Haas publication reports tests on a 28 day air cured sample showing a reading of 500 PSI whereas the Pittsburgh Testing Laboratory report on tests of the material of the present invention in two samples 28 day air cured, provided readings of 1,025 PSI and 1,087 PSI, respectively, showing the obvious superiority of the Portland cement composition of the present invention.

On abrasion resistance, the Rohm & Haas publication reported tests on 28 day air cured samples showing material loss of 1.70 grams, whereas the Pittsburgh Testing Laboratory reports on the Portland cement composition of the present invention showed a loss of only 1.1183 grams which is nearly half the material loss of the Rohm & Haas test sample and shows the obvious superiority of the Portland cement coating composition of the present invention.

Those skilled in the art will observe that a Portland cement coating composition having the unique and unexpected characteristics of the composition of the present invention makes possible the production of considerably improved precast Portland cement wall, floor and roof panels for use in building constructions which are relatively thin with respect to their overall area and thickness and are frequently used as exterior surfacing materials directly exposed to temperature and weather changes.

The material of the present invention in addition to the highly desirable and unexpected characteristics hereinbefore noted has an unusual fire resistance characteristic. Tests of the material subjected to a flame at 2300° F. for fifteen minutes showed no visual damage whereas Portland cement compositions heretofore known in the art erupt, crack, and show visual deterioration at considerably lower temperatures.

Applications of the acrylic polymer Portland cement coating composition of the present invention are particularly useful in forming Portland cement based ornamental panels having pebble carrying surfaces as the unusual and unexpected shear bond adhesion firmly locks the pebbles which may be various ornamental rounded stones to the panel formed of the composition. Building blocks, such as cement blocks and the like as known in the industry, are advantageously provided with a coating of the present composition on one or more of their surfaces so that a wall formed of these units has the unusual characteristics of the material.

Tests of the composition disclosed herein relating to the thin coating and patching of aged, worn, cracked and eroded cement sidewalks and pavements and extending for a period of more than 10 months and through a complete fall, winter and spring season show no damage to the coated areas, no spalling and no breaking away of the coating whereas comparable damaged concrete sidewalks patched with conventional Portland cement mixtures, some including acrylic polymers show substantially less shear bond adhesion with spalling, and breaking away of the coating material in tests of the same duration in the same location and subjected to the same weather and wear conditions.

The color coding hereinbefore mentioned is advantageous in applying the Portland cement coating composition herein disclosed, for example utilizing a green food color additive to the propylene glycol aqueous solution causes the mixture to assume a blue color when too much water is added. When the proper amount of water is added to achieve a desirable coating consistency, the material takes on a dark green color changing to amber green as the coating sets and in several days changing again to a light greenish brown which remains until the coating material is subjected to a thorough wetting down as from rain in a weather area, whereupon the final color is a light gray.

It will thus be seen that an unusual acrylic polymer Portland cement coating composition has been disclosed, which due to its relatively high Portland cement content, high defoamer content and the presence of a critical amount of propylene glycol produces a Portland cement coating material with unusual and highly desirable characteristics including excellent compressive strength, exceedingly high flexural strength, very high unexpected shear bond adhesion and retaining better than normal tensil strength and impact strength and possessing an unusually and unexpected high abrasion resistance. The material is relatively inexpensive to form, relatively easy to mix, and in the proper and desirable consistency, unusually cooperative in trowel applications or spraying applications due to its extremely low slump and highly adhesive characteristics. Changes in the amounts of acrylic polymer and Portland cement may be made within certain limits provided the ratio of propylene glycol to acrylic polymer is maintained. For example the aqueous dispersion of acrylic polymer may be used in amounts between about 5% to about 7% by weight of the total composition and the Portland cement may be used in amounts between about 23% to about 38% by weight of the total composition.

Although but two embodiments of the present invention have been described, it will be apparent to those skilled in the art that some changes and modifications may be made in the composition so long as the criticality of the acrylic polymer, the Portland cement, the defoamer, and the modifying agent, propylene glycol, remain in substantially relative amounts with respect to one another, all without departing from the spirit of the invention.

Having thus described my invention, what I claim is:

1. An improved coating composition comprising:
   (1) between about 5% and about 7% by weight of an aqueous dispersion of an acrylic polymer,
   (2) between about 23% to about 38% by weight of a type 1 Portland cement,
   (3) 50% by weight sand,
   (4) about 0.015% by weight of an aqueous solution of propylene glycol,
   (5) approximately 0.2% by weight of a defoaming agent, and
   (6) the balance to 100% by weight water, the % by weight based on the total weight of the composition.

2. The improved coating composition set forth in claim 1 and wherein the acrylic polymer is one of a group of acrylic resins comprising a thermoplastic polymer of acrylic acid, methacrylic acid, or acrylonitrile.

3. The improved coating composition set forth in claims 1 or 2 wherein the propylene glycol is one of a group comprising 1,2 propylene glycol, 1.2 dihydroxypropane, 1.2 propanediol, methylene glycol or methyl glycol.

4. The improved coating composition set forth in claim 1 wherein said defoamer is dimethylpolysiloxane.

5. The improved coating composition set forth in claim 1 wherein the Portland cement is 50% by weight of the total composition.

6. The improved coating composition set forth in claim 1 wherein the acrylic polymer is 6% by weight of the total composition.

* * * * *

UNITED STATES PATENT AND TRADEMARK OFFICE
CERTIFICATE OF CORRECTION

PATENT NO. : 4,430,463
DATED : February 7, 1984
INVENTOR(S) : Perry D. Mullenax

It is certified that error appears in the above-identified patent and that said Letters Patent is hereby corrected as shown below:

On the title page delete "/73/ Assignee: Michigan Hanger Company, Inc., Hubbard, Ohio"

Signed and Sealed this

Fourth Day of September 1984

[SEAL]

*Attest:*

GERALD J. MOSSINGHOFF

*Attesting Officer*     *Commissioner of Patents and Trademarks*